March 16, 1954 W. H. T. HOLDEN 2,672,521

CHANNEL TESTING CIRCUIT

Filed Oct. 17, 1950 2 Sheets-Sheet 1

INVENTOR
W. H. T. HOLDEN
BY C. Mattice
ATTORNEY

March 16, 1954 W. H. T. HOLDEN 2,672,521

CHANNEL TESTING CIRCUIT

Filed Oct. 17, 1950 2 Sheets-Sheet 2

INVENTOR
W. H. T. HOLDEN
BY C. Mathias
ATTORNEY

Patented Mar. 16, 1954

2,672,521

UNITED STATES PATENT OFFICE 2,672,521

CHANNEL TESTING CIRCUIT

William H. T. Holden, Pasadena, Calif., assignor to Bell Telephone Laboratories, Incorporated, New York, N. Y., a corporation of New York Application October 17, 1950, Serial No. 190,491

5 Claims. (Cl. 179—18)

This invention relates to automatic telephone systems employing common control equipment and has for its object to improve the testing and selecting operations of such equipment.

In a telephone system in which connections are completed by means of cross-bar switches, the selection of the necessary switch elements is under the control of a common control circuit known as a marker. A system of the type to which the present invention relates is shown in United States Patent 2,235,803 to W. W. Carpenter, dated March 18, 1941.

The setting up of a complete connection in such a system takes place in two stages, one connecting the calling line by way of a district junctor to a trunk and the other connecting the trunk to the called line. The two stages are handled by separate markers and may also be set up as parts of outgoing calls or incoming calls.

When a marker is called upon to set up one stage of a connection it receives an indication of the identity of the circuits to be connected and connects therewith. It then tests for and selects an idle channel by which these circuits may be connected and operates the switches making up the channel to connect the circuits.

A channel includes cross-points on four switches and the three links connecting these cross-points. In order to identify an idle channel, the marker must first test the three links of each channel. Having found such an idle channel, the marker first operates the proper select magnets of the switches, and then operates the hold magnets. It then tests the established connection and releases.

In previous systems when testing for an idle channel the channel test relays of the marker are connected with the channel elements over contacts of a plurality of multicontact relays. The channel test relays have battery connected to their windings and operate from busy ground applied to the channel elements, the channel corresponding to the first non-operated set of test relays being selected. It will be apparent that, if any of the contacts on the multicontact relays fails to close properly, or if one of the circuits is otherwise open, it is possible to select a channel which includes a busy element. The test of the established connection prevents the use of such an erroneously selected channel, but requires the reoperation of the marker.

In accordance with the present invention improved channel testing means is provided, including means for testing for open channel testing leads.

More specifically, the marker is equipped with electronic testing means supplied with battery by means of voltage dividers so arranged that the testing means may distinguish three conditions of the test leads, namely busy, idle and open.

Figure 1:
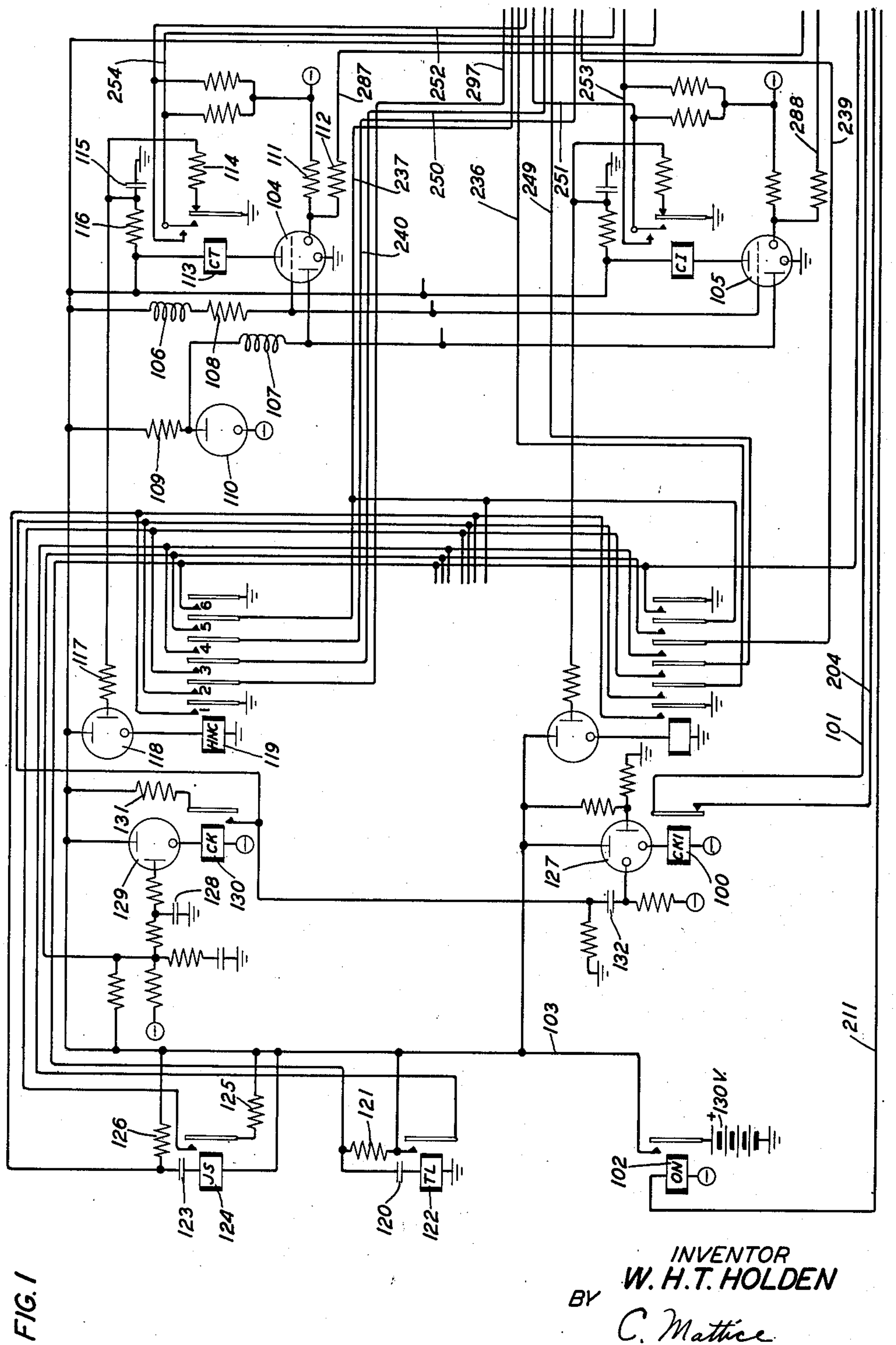
Figure 2:
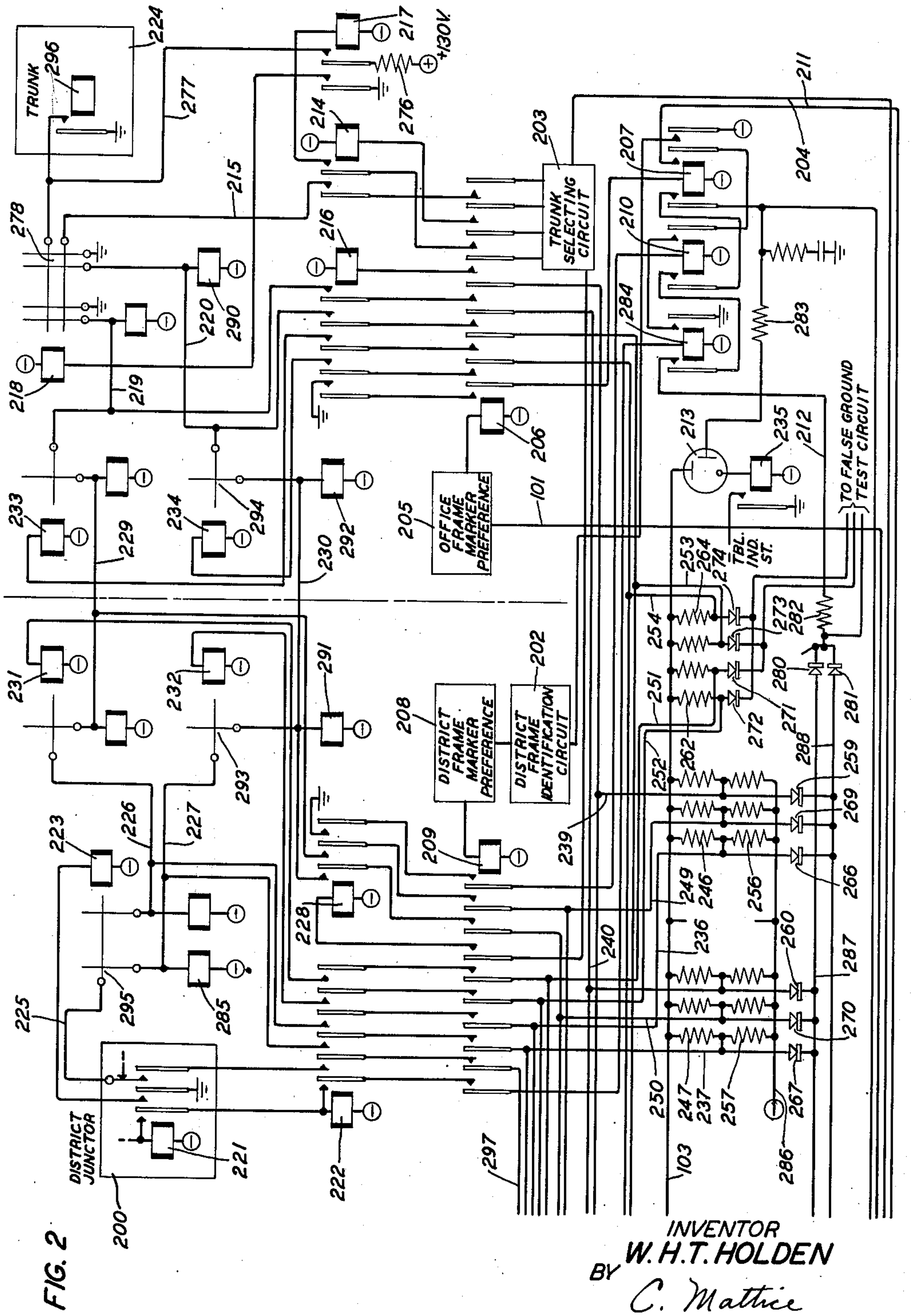

These and other features of the invention will be more clearly understood from a consideration of the following description in connection with the drawings in which Figs. 1 and 2 when placed side by side show the channel testing circuits and a skeletonized showing of the channels and the connecting relays.

This channel testing circuit is especially adapted for use in a cross-bar dial system of the type disclosed in the above-identified patent to W. W. Carpenter and reference is made to that patent for a complete description of the operations only briefly described herein.

When a call is initiated the calling line is automatically connected with an idle district junctor such as junctor 200 and to an idle sender (not shown). The designation of the wanted line is recorded in the sender which, as soon as it has received the designation of the wanted office, connects with an idle marker including the channel testing equipment shown. The number of the frame on which district junctor 200 is located is recorded in the district frame identification circuit 202 and the office designation is registered and translated into a route which determines the operation of the trunk selecting circuit 203. The trunk selecting circuit, when operated, determines the office frame on which the trunks leading to the desired office are located and closes a circuit over conductor 204, back contact of relay 100, conductor 101 to the marker preference circuit 205 of the selected office frame. When the frame is available, the preference circuit 205 operates multicontact relay 206 to connect the marker with the equipment of the office frame. A circuit is then closed under the control of the district frame identification circuit 202 for operating the marker preference circuit 208 of the district frame on which junctor 200 is located. When the frame is available, the preference circuit 208 operates multicontact relay 209 which connects the marker with the equipment of the district frame.

In the meantime, as described in the above-identified Carpenter patent, the marker operates relay 214 which is individual to the group of trunks leading to the desired office and relay 214 extends the test conductors 215, etc. of these trunks to the marker which selects an idle trunk 224 and then operates relays 216 and 217. Relay 217 operates select magnet 218 individual to the selected trunk 224, while relay 216 extends the test circuits 219, 220, etc. of the twenty trunk links, which serve the selected trunk, to conductors 239, 240, etc. in the marker for test. Relay 216 also closes a circuit from ground over a contact of relay 206 to battery through the winding of relay 207 to indicate that it has operated.

The marker, through the sender, operates relay 221 in the district junctor 200, which extends its operating ground to the winding of relay 222. In addition, relay 221 operates select magnet 223, individual to district junctor 200. Relay 222 operates and extends its operating ground to the marker over a contact of relay 209 to the winding of relay 284, operating that relay to inform the marker that it has operated. In addition it extends the test conductors 226, 227, etc. of the twenty district links to conductors 236, 237, etc., in the marker for test. With relays 221, 222 and 209 operated, the outgoing sleeve conductor 225 of the district junctor is also extended to the marker. A circuit is also closed under the joint control of the trunk selecting circuit 203 and relay 209 individual to the district frame to operate relay 228 which connects the test conductors 229, 230, etc. of the twenty office junctors forming parts of the channels which may be used to connect district junctor 200 with trunk 224, to conductors 249, 250, etc. in the marker for test. Relay 228 also closes a circuit from ground over a contact of relay 209 to battery through the winding of relay 210 to indicate to the marker that it has operated.

Relay 222 also extends the operating circuits for the select magnets 231, 232, etc. individual to the district links in the district secondary switches, over contacts of relay 209 to conductors 251, 252, etc. in the marker, while relay 216 extends the operating circuits for select magnets 233, 234, etc. individual to the office links in the office primary switches, over contacts of relay 206 to conductors 253, 254, etc. in the marker.

From the foregoing description it will be apparent that for each possible channel, there are five circuits in the marker, namely, three test circuits for the three links, which are also used for operating the associated hold magnets, and two operating circuits for select magnets.

When relays 207, 210 and 284 have operated as an indication that the test circuits have been extended to the marker, a circuit is closed from ground over the right contacts of relays 284, 210 and 207, conductor 211 to battery through the winding of relay 102. Relay 102 operates, connecting +130 volt battery to conductor 103.

With +130 volt battery connected to conductor 103, a plurality of voltage divider circuits are energized. Each of these circuits extends from −48 volt battery on conductor 286 to +130 volt battery on conductor 103 and is made up of two high resistances. There is a voltage divider for each of the three test circuits for twenty channels, that is sixty in all. Each test circuit is connected to the junction between the resistances of one voltage divider. For example, conductor 237 of the marker which has been connected to test conductor 227 of a district link is connected to the junction between resistances 247 and 257.

Test conductor 227 is marked with ground through a low resistance when the associated district link is busy and with −48 volt battery through the low resistance winding of the associated hold magnet when the link is idle. Resistances 247 and 257, as well as the resistances of the other voltage dividers, are of such magnitude that the potentials on conductor 237 do not appreciably differ from those on conductor 227 when these two conductors are connected together. However, if because of faulty contact closure or a break in one of the wires, conductor 227 is not connected to conductor 237 a potential of +50 volts appears on conductor 237.

Conductors 237, 250 and 240, connected to the test conductors of the three links making up a channel are connected individually to the input of rectifiers 267, 270 and 260 the outputs of which are in turn connected in multiple to conductor 287 and a common rectifier 280.

A similar arrangement is provided for each channel and the outputs of the common rectifiers are in turn connected in multiple and through resistance 282, conductor 212, contacts of relays 284, 210 and 207, resistance 283 to the control anode of tube 213. With this arrangement, the potential on conductor 212 will be that of the most positive of the test conductors. Therefore if all of the test circuits are complete, the potential on conductor 212 will be either −48 volts or zero.

However, if any one of the test circuits is incomplete, the potential on conductor 212 will be +50 volts. With +50 volts connected to the control anode of tube 213 and −48 volts connected through relay 235 to the cathode the voltage drop across the control gap is sufficient to cause the tube to break down, whereupon relay 235 operates across the main gap to +130 volt battery on conductor 103. Relay 235 causes the trouble indicator to make a record, but does not interfere with channel selection.

A channel test tube, such as tube 104 or 105, is provided for each of the twenty channels. These tubes are five-element, separate starter screen grid types, arranged in a lock-out chain with impedances 106 and 107 in the screen and starter anode circuits, respectively. Following the operation of relay 102, which takes place, as above described, after the test circuits have been closed through to the marker, the screens are connected through resistance 108 and impedance 106 to the full +130 volt battery. The starter anodes are connected through impedance 107 to a reduced positive potential, about 105 volts, obtained from the +130 volt source by means of resistance 109 and voltage regulator tube 110.

Referring to tube 104, −48 volt battery is normally connected through high resistance 111 to the starter cathode of tube 104. Conductor 287, to which the test conductors of this channel are connected, is also connected through resistance 112 to the starter cathode of tube 104. As previously described, if all of the test circuits are complete and connected to idle links, the potential on conductor 287 will be approximately −48 volts. If any link is busy, ground potential appears on conductor 287 and if any test circuit is open +50 volts appear on that conductor. With either ground or +50 volts on conductor 287, the resulting potential on the starter cathode will be such that, when potential is applied to the starter anode, no breakdown will take place. With −48 volts on conductor 287, the starter anode-starter cathode gap will break down, followed in turn by a breakdown of the screen and starter cathode gap and breakdown of the main cathode-main anode gap.

Only one of the channel test tubes 104, 105, etc. will operate as the reduction of screen voltage in the operated tube renders the first transfer impossible in other tubes.

Assuming that tube 104 is the one to operate, relay 113, included in the main gap circuit, operates. Relay 113 may conveniently be a mercury contact relay. As soon as relay 113 operates, it connects ground to conductors 252 and 254 operating select magnets 232 and 234 to prepare the cross-points of the district secondary and office primary switches.

The operation of relay 113 disconnects ground from in shunt of condenser 115 and that condenser starts to charge through resistance 116 from +130 volt battery on conductor 103. Condenser 115 is connected through resistance 117 to the control electrode of tube 118 and after an interval, determined by the values of resistance 116 and condenser 115, the potential on condenser 115 rises to a sufficient value, tube 118 breaks down and relay 119 operates over the main gap of tube 118 to +130 volt battery on conductor 103.

Relay 119 extends the links of the selected channel to the hold magnet operating circuits. Condenser 120 has been previously charged from battery on conductor 103 through resistance 121 and the winding of relay 122. When relay 119 operates, it connects ground over its contact 6 to condenser 120 in shunt of resistance 121 and condenser 120 discharges, relay 122 operating from the discharge current. While relay 122 is operated, it connects +130 volt battery from conductor 103 over its contact and contact 4 of relay 119, conductor 240 and over contacts of relays 206 and 216 to —48 volt battery through the winding of hold magnet 290 of the secondary office switch. Magnet 290 closes the cross-point 278 prepared by select magnet 218, thereby connecting ground to conductor 215 to mark the trunk busy to other markers. When relay 217 operated as previously described, it connected +130 volt battery through resistance 276 to conductor 277. Therefore with cross-point 278 closed, magnet 290 is held operated under the control of relay 217.

Relay 119 also connects ground over its contact 1 to condenser 123, causing that condenser to charge through the winding of relay 124 from +130 volt battery on conductor 103. Relay 124 operates from this charging current and closes a circuit from +130 volt battery on conductor 103, resistance 125, contact of relay 124, contact 3 of relay 119, conductor 250 over contacts of relays 209 and 228 to —48 volt battery through the windings of hold magnets 291 and 292. Magnet 292 closes cross-point 294 prepared by select magnet 234, extending the +130 volt battery supplied by relay 217 to conductor 230 to hold both magnets 292 and 291 operated. Magnet 291 closes cross-point 293 prepared by select magnet 232, extending +130 volt battery to conductor 227, operating hold magnet 285 which closes cross-point 295, and connects conductor 227 to conductor 225.

With relay 119 operated +130 volt battery on conductor 227 is connected over contacts of relays 222 and 209, conductor 237, contact 5 of relay 119 to condenser 128. Condenser 128, which is connected to the control cathode of tube 129, charges in this circuit and when the potential on condenser 128 reaches the break-down potential, tube 129 breaks down and relay 130 operates. Relay 130 connects +130 volt battery on conductor 103 through resistance 131 to condenser 132 causing the condenser to charge.

As soon as cross-point 295 is closed the calling line is connected through to the trunk, causing the operation of relay 296 which connects ground to conductor 277. Conductor 277 is connected through cross-point 278, conductor 220, cross-point 294, conductor 230, cross-point 293, conductor 227, cross-point 295, conductor 225, contacts of relays 221, 222 and 209, conductor 297, contact 2 of relay 119 to condenser 132, causing that condenser to discharge. Condenser 132 is connected to the control cathode of tube 127 which is so wired that the negative surge produced by the discharge of condenser 132 causes the tube to break down and operate relay 100.

Relay 100 operated opens the circuit over which the office frame marker preference circuit operated, thereby releasing the office frame connector circuits followed by the district frame connector circuits.

The release of the district frame connector circuits releases relay 221, extending conductor 225 to the sleeve of the district junctor to hold that circuit.

With the frame connector circuits released, relays 284, 210 and 207 release, in turn releasing relay 102 to remove +130 volt battery from conductor 103 and restore the channel testing circuits to normal. The further operation of the marker takes place as described in the above-mentioned patent.

If relay 235 has been operated because one of the channel test circuits was open, a trouble indicator record will be made before the marker can release.

While the foregoing description is directed to the establishment of the outgoing stage of a call, it will be apparent that a similar arrangement would be equally applicable to the incoming stage.

What is claimed is:

1. In a telephone system, incoming circuits, outgoing circuits, a plurality of channels each comprising a plurality of sections for connecting an incoming circuit and an outgoing circuit, a test conductor for each of said channel sections normally marked with negative battery or ground according as said section is idle or busy, and means to simultaneously test the sections of a channel for an idle condition, a busy condition or an open condition on any one of said sections, including a circuit network for supplying a positive potential to each of said test conductors, said positive potential being neutralized by the negative battery or ground on the connected channel section, an asymmetric conducting device individual to each of said test conductors, a channel test conductor, a negative potential connected to said channel test conductor, the test conductors of one channel being connected in multiple through said individual asymmetric conducting devices to said channel test conductor, said asymmetric conducting devices being poled to pass the more positive potentials to said channel test conductor, whereby the negative potential on said channel test conductor is counteracted if any one of said test conductors is busy or open, a channel selecting electronic tube device connected with said channel test conductor and responsive to the presence of said negative potential on said channel test conductor, and a trouble indicating electronic tube device also connected with said channel test conductor and responsive to the presence of positive potential on said channel test conductor due to an open test conductor.

2. In a telephone system, incoming circuits, outgoing circuits, a plurality of channels each comprising a plurality of sections for connecting an incoming circuit and an outgoing circuit, a test conductor for each of said channel sections normally marked with negative battery or ground according as said section is idle or busy, testing means for each of said channels for testing said channels simultaneously, each of said testing means including means to simultaneously test the sections of a channel for an idle condition, a busy condition or an open condition on any one of said sections, including a circuit network for supplying a positive potential to each of said test conductors, said positive potential being neutralized by the negative battery or ground on the connected channel section, an asymmetric conducting device individual to each of said test conductors, a channel test conductor for each channel, a negative potential connected to each of said channel test conductors, the test conductors of the sections of one channel being connected in multiple through their individual asymmetric conducting devices to said channel test conductor, said asymmetric conducting devices being poled to pass the more positive potentials to said channel test conductor, whereby the negative potential on said channel test conductor is counteracted if any one of said test conductors is busy or open, a channel selecting electronic tube device connected with each of said channel test conductors and responsive to the presence of said negative potential on said channel test conductor, circuits interconnecting said channel selecting electronic tube devices to permit only one responsive tube to operate, an auxiliary asymmetric conducting device connected to each of said channel test conductors and poled to pass positive potential, and a trouble indicating electronic tube device connected to all of said channel test conductors through said auxiliary asymmetric conducting devices and responsive to the presence of positive potential on any one of said channel test conductors due to an open test conductor.

3. In a telephone system, incoming circuits, outgoing circuits, a plurality of channels each comprising a plurality of sections for connecting an incoming circuit and an outgoing circuit, a test conductor for each of said channel sections normally marked with negative battery or ground according as said section is idle or busy, a common testing device, means for connecting said channel sections with said testing device, said device including testing means for each of said channels for testing said channels simultaneously, each of said testing means including a circuit network for supplying a positive potential to each of said test conductors, said positive potential being neutralized by the negative battery or ground on the connected channel section, an asymmetric conducting device individual to each of said test conductors, a channel test conductor for each channel, a negative potential connected to said channel test conductor, the test conductors of the sections of one channel being connected in multiple through their individual asymmetric conducting devices to said channel test conductor, said asymmetric conducting devices being poled to pass the more positive potentials to said channel test conductor, whereby the negative potential on said channel test conductor is counteracted if any one of said test conductors is busy or open, a channel selecting gas-filled tube connected with each of said channel test conductors and responsive to the presence of said negative potential on said channel test conductor, an auxiliary asymmetric conducting device connected to each of said channel test conductors and poled to pass positive potential, a trouble indicating gas-filled tube connected to all of said channel test conductors through said auxiliary asymmetric conducting devices and responsive to the presence of positive potential on any one of said channel test conductors due to an open test conductor, means operated as a result of the connection of said channel sections with said testing device to render said gas-filled tubes responsive, means for preventing more than one of said operative channel testing tubes from operating, and means under the control of an operated channel testing tube to connect said sections to establish a connection between an incoming circuit and an outgoing circuit including said selected channel and to release said testing means.

4. In a telephone system, incoming circuits, outgoing circuits, a plurality of channels each comprising a plurality of sections for connecting an incoming circuit and an outgoing circuit, a test conductor for each of said channel sections normally marked with negative battery or ground according as said section is idle or busy, a common testing device, means for connecting said channel sections with said testing device, said device including testing means for each of said channels for testing said channels simultaneously for an idle channel, and means for testing all of said sections for an open section or test conductor including a circuit network for supplying a positive potential to each of said test conductors, said positive potential being neutralized by the negative battery or ground on the connected channel section, an asymmetric conducting device individual to each test conductor, said asymmetric conducting devices being poled to pass the more positive potentials to said channel test conductor, a trouble indicating gas-filled tube connected to all of said channel test conductors through said asymmetric conducting devices and responsive to the presence of positive potential on any one of said test conductors, and means under the control of said trouble indicating tube to cause a trouble indicating record to be made.

5. In a telephone system, incoming circuits, outgoing circuits, a plurality of channels each comprising a plurality of sections for connecting an incoming circuit and an outgoing circuit, a test conductor for each of said channel sections normally marked with negative battery or ground according as said section is idle or busy, a common testing device, means for connecting said channel sections with said testing device, said device including testing means for each of said channels for testing said channels simultaneously for an idle channel, and means for testing all of said sections for an open section or test conductor including a circuit network for supplying a positive potential to each of said test conductors, said positive potential being neutralized by the negative battery or ground on the connected channel section, an asymmetric conducting device individual to each test conductor, a channel test conductor for each channel, the test conductors of the sections of one channel being connected in multiple through their individual asymmetric conducting devices to said channel test conductor, said asymmetric conducting devices being poled to pass positive potentials to said channel test conductor, an auxiliary asymmetric conducting device connected to each of said channel test conductors and poled to pass positive potential, a trouble indicating gas-filled tube connected to all of said channel test conductors through said auxiliary asymmetric conducting devices and responsive to the presence of positive potential on any one of said channel test conductors, and means under the control of said trouble indicating tube to cause a trouble indicating record to be made.

WILLIAM H. T. HOLDEN.

References Cited in the file of this patent

UNITED STATES PATENTS

| Number | Name | Date |
|---|---|---|
| 1,563,555 | Clark | Dec. 1, 1925 |
| 2,233,282 | Buchanan et al. | Feb. 25, 1941 |
| 2,235,803 | Carpenter | Mar. 18, 1941 |
| 2,299,898 | Holden | Oct. 27, 1942 |
| 2,332,015 | Scheer | Oct. 19, 1943 |
| 2,490,810 | Horwitz | Dec. 13, 1949 |
| 2,502,415 | Bray et al. | Apr. 4, 1950 |
| 2,580,757 | Germanton | Jan. 1, 1952 |
| 2,582,959 | Bruce et al. | Jan. 22, 1952 |